United States Patent
Hörderich

(10) Patent No.: US 12,228,696 B1
(45) Date of Patent: Feb. 18, 2025

(54) SENSOR ARRANGEMENT

(71) Applicant: Leuze electronic GmbH + Co. KG, Owen/Teck (DE)

(72) Inventor: Johann Hörderich, Mammendorf (DE)

(73) Assignee: Leuze electronic GmbH + Co. KG, Owen/Teck (DE)

( * ) Notice: Subject to any disclaimer, the term of this patent is extended or adjusted under 35 U.S.C. 154(b) by 0 days.

(21) Appl. No.: 18/735,273

(22) Filed: Jun. 6, 2024

(51) Int. Cl.
*G01V 8/20* (2006.01)

(52) U.S. Cl.
CPC ...................... *G01V 8/20* (2013.01)

(58) Field of Classification Search
CPC .................. G01V 8/12; G01V 8/20
See application file for complete search history.

(56) References Cited

FOREIGN PATENT DOCUMENTS

| DE | 102006053546 A1 | * | 5/2008 | ............... G01V 8/20 |
| DE | 202020104223 U1 | * | 11/2021 | ............... G01V 8/20 |

* cited by examiner

*Primary Examiner* — Kevin K Pyo
(74) *Attorney, Agent, or Firm* — Michael Soderman

(57) ABSTRACT

A sensor arrangement with an optical sensor, wherein the optical sensor has at least one beam axis which is formed by a transmitter emitting light beams and a receiver spatially separated from the transmitter, which receiver is formed to receive the light beams of the transmitter. The sensor also has an evaluation unit or a control and evaluation unit in which an object detection signal is generated depending on the received signals of the receiver. Optical communication between transmitter and receiver is possible by means of the light beams. The transmitter transmits operating information and/or diagnostic information to the receiver by means of the light beams. The receiver and the evaluation unit or the control and evaluation unit are integrated in a housing on which there is a display unit.

16 Claims, 7 Drawing Sheets

Fig. 5

| Diagnostic information |
| Article number |
| Serial number |
| Year of manufacture |
| Firmware version |
| Current configuration |
| Type designation |
| Diagnostic information |
| Article number |
| ... |

Fig. 6

| Diagnostic information |
| Type designation |
| Diagnostic information |
| Article number |
| Diagnostic information |
| Serial number |
| Diagnostic information |
| Year of manufacture |
| Diagnostic information |
| ... |

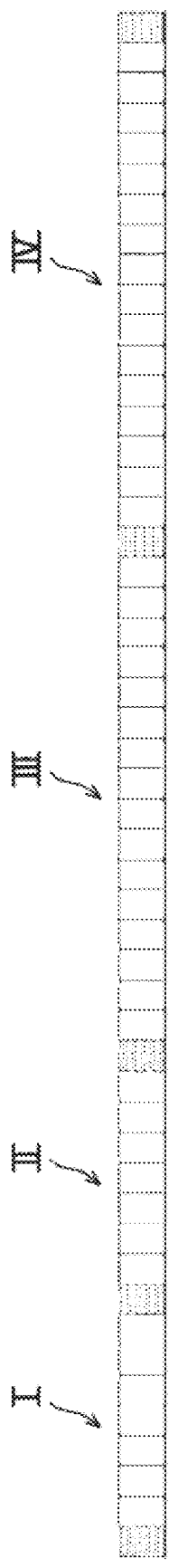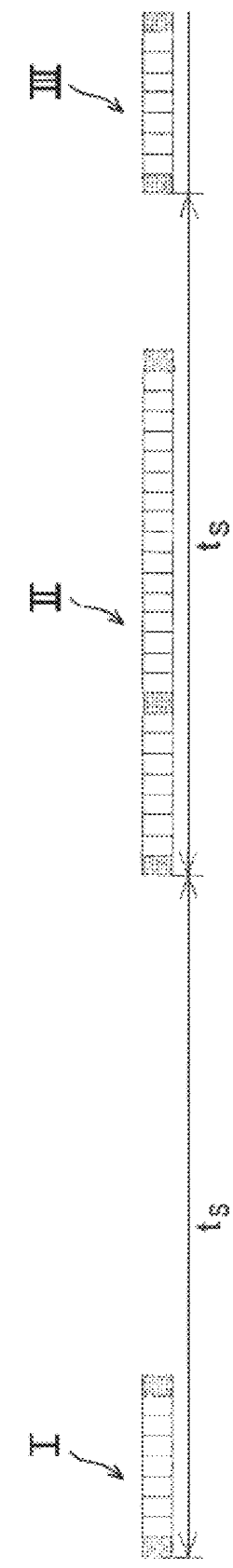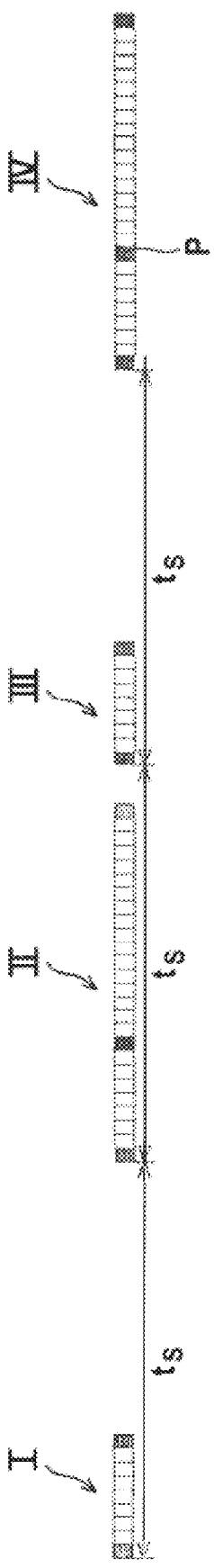

SENSOR ARRANGEMENT

CROSS REFERENCE TO RELATED APPLICATIONS

None.

BACKGROUND

The invention relates to a sensor arrangement.

Such sensor arrangements comprise an optical sensor, which in particular can be formed by a light curtain.

The optical sensor is generally used for capturing objects in a monitoring area. An optical sensor formed as a light curtain typically comprises a line arrangement of transmitters emitting light beams in a first housing at one edge of the monitoring area and a line arrangement of receivers receiving light beams in a second housing at the opposite edge of the monitoring area. Furthermore, an evaluation unit is provided in which the receiver generates an object detection signal depending on the received signals. This object detection signal is preferably a binary switching signal whose switching states indicate whether an object is located in the monitoring area or not.

Typically, the individual transmitters emit light beams in the form of light pulses. The light pulses can form codings based on which the light beams of the individual transmitters are distinguishable. A differentiation between light beams of different light curtains is also possible.

This can be used to optically synchronize the light curtain based on the light beams of a transmitter, so that transmitter-receiver pairs of the light curtain are then activated cyclically one after the other to perform object detection in the monitoring area.

In general, the optical sensor can also be formed in the form of a light barrier with only one transmitter and one receiver.

SUMMARY

The invention relates to a sensor arrangement (100) with an optical sensor, wherein the optical sensor has at least one beam axis which is formed by a transmitter (4) emitting light beams (3) and a receiver (6) spatially separated from the transmitter (4), which receiver is formed to receive the light beams (3) of the transmitter (4). The sensor also has an evaluation unit (9) or a control and evaluation unit (14) in which an object detection signal is generated depending on the received signals of the receiver (6). Optical communication between transmitter (4) and receiver (6) is possible by means of the light beams (3). The transmitter (4) transmits operating information and/or diagnostic information to the receiver (6) by means of the light beams (3). The receiver (6) and the evaluation unit (9) or the control and evaluation unit (14) are integrated in a housing (2b) on which there is a display unit (15). The operating information and diagnostic information is stored and evaluated in the evaluation unit (9) or control and evaluation unit (14) and displayed on the display unit (15).

DETAILED DESCRIPTION

The object of the invention is to provide a light curtain with extended functionality.

The features of claim 1 are intended to provide a solution to this object. Advantageous embodiments of the invention and appropriate further developments are described in the dependent claims.

The invention relates to a sensor arrangement with an optical sensor. The optical sensor has at least one beam axis, which is formed by a transmitter emitting light beams and a receiver spatially separated from the transmitter, which receiver is formed to receive the light beams of the transmitter. The optical sensor also has an evaluation unit or a control and evaluation unit in which an object detection signal is generated depending on the received signals of the receiver. Optical communication between transmitter and receiver is possible by means of the light beams. The transmitter transmits operating information and/or diagnostic information to the receiver by means of the light beams. The receiver and the evaluation unit or the control and evaluation unit are integrated in a housing on which there is a display unit. The operating information and diagnostic information is stored and evaluated in the evaluation unit or control and evaluation unit and displayed on the display unit.

The term operating information stands for information which is transmitted during regular operation and is used here to represent various types of information, e.g. information for identifying the sensor such as article number, serial number or customer-specific information. Furthermore, there may be information about the physical characteristics of the sensor, such as the number of beams, resolution, maximum transmission power and the like. Analogously, this also includes information on operating states and ambient conditions such as temperature and supply voltage. Finally, this also includes manufacturer or customer-specific configurations such as channel selection, set transmission power, etc.

The optical sensor of the sensor arrangement according to the invention is used in a known manner for capturing objects in a monitoring area. The transmitter or transmitters and the receiver or receivers of the optical sensor are generally arranged at opposite edges of the monitoring area. In the simplest case, the optical sensor is a light barrier with only one transmitter and one receiver. It is particularly advantageous if the optical sensor is a light curtain. The transmitters and receivers of the light curtain form cooperating transmitter-receiver pairs and thus beam axes in such a way that the light beams of the transmitter of one transmitter-receiver pair hit the receiver of this transmitter-receiver pair in unhindered manner when the monitoring area is clear. If an object interferes in the monitoring area, it interrupts the beam path of at least one of the light beams, whereby the object is detected. For this purpose, an object detection signal is generated in an evaluation unit of the light curtain depending on the received signals of the receivers. The functionality of a light barrier is equivalent.

According to the invention, operating information and/or diagnostic information is transmitted from transmitters via their light beams to assigned receivers. In an evaluation unit or control and evaluation unit assigned to the receiver or receivers, which unit also evaluates the received signals of the receiver or receivers to generate an object detection signal, the diagnostic information and/or operating information of the transmitter or transmitters but also of the receiver or receivers is stored and also evaluated, in particular for generating information derived from the operating information and/or diagnostic information. The receiver or receivers and the evaluation unit or transmitter and evaluation unit are integrated in a housing on which a display unit is arranged in accordance with the invention. The display unit can be used to display all operating information and/or diagnostic information as well as information derived therefrom, keeping a user fully informed about the status of the optical sensor.

Optionally, the operating information and/or diagnostic information or information derived therefrom is additionally output via a communication system and fed to an external unit.

With the operating information and diagnostic information, transmitter information is transmitted contactlessly to the receivers and from there output directly or after an evaluation via the communication system to the external unit as a further component of the sensor arrangement and used there for control purposes and the like.

A significant advantage consists in the fact that for communication with the external unit a communication system only needs to be provided on the receiver side, but not on the transmitter side, since sensor information is sent to the receiver contact-free via the light beams.

According to a first variant, the optical sensor has two spatially separated transceivers, respectively with an arrangement of transmitters and receivers and a control and evaluation unit, wherein there is a display unit on at least one housing of the transceivers.

According to a second variant, the or all transmitters of the optical sensor are integrated in a transmitter unit and the or all receivers in a receiver unit. The evaluation unit is integrated in the housing of the receiver unit and the display unit is arranged on this housing.

According to an advantageous further development, operating information and/or diagnostic information and/or information derived from operating information and/or diagnostic information is output to an external unit via a communication system.

To connect the communication system, a digital or analog interface is assigned to the evaluation unit or the control and evaluation unit.

In particular, the communication system can be an IO-link connection, a field bus or a Bluetooth, WLAN or NFC data connection.

According to an advantageous embodiment, the evaluation unit or the control and evaluation unit has a non-volatile memory in which operating information and/or diagnostic information and/or information derived therefrom is storable. Operating information and/or diagnostic information and/or information derived therefrom can be read out from the non-volatile memory at predeterminable times and output via the interface.

This makes it easy and flexible to control the timing behavior of information output via the communication system.

According to an advantageous embodiment, the external unit is or has an operating or display device.

This external unit can be used to implement control functions for the optical sensor. The external unit can perform the function of a master, in particular if the optical sensor is integrated into a bus system via the communication system.

In addition, operating information and/or diagnostic information is displayable by means of the display device.

The operating information is generally device information of the optical sensor such as article number, serial number, year of manufacture, version number or type designation. In addition, operating information comprises configurations of the optical sensor.

The diagnostic information is status information of the optical sensor; diagnostic information in particular includes error states of the optical sensor. Here it is advantageous that the transmitters can still send diagnostic information in the event of an error, so that error states of the transmitters can be sent to the receiver unit so that appropriate measures can be taken there.

This is advantageous in particular if the optical sensor is a safety sensor, i.e. has a fail-safe design that enables it to be used in safety applications.

In this case, the safety sensor is transferred to a safe state if an error state is detected based on the diagnostic information.

In particular, a safe state is realized by switching off the optical sensor and/or a plant monitored by it.

According to an advantageous embodiment of the invention, only diagnostic information is transmitted in an error or diagnostic state of the transmitter or transmitters.

In contrast, in a normal state of the transmitter or transmitters, operating information is transmitted alone or combined with diagnostic information.

Advantageously, the transmitter or transmitters are automatically transferred to the error or diagnostic state, in particular event-controlled, if an error is detected in the optical sensor on the transmitter side.

Another advantage is that only diagnostic information is transmitted by the transmitter or transmitters for a predetermined time period after the error or diagnostic state has ceased. After this time period has elapsed, operating information is transmitted.

Finally, time control is possible in such a way that the transmission of operating information and/or diagnostic information is started upon switching on the transmitter or transmitters and maintained for a predetermined time period.

As a result of the diagnostic information transmitted with the transmitters, the status information of the transmitters is currently available in the receiver unit, where it is evaluated. In particular, safety measures can be taken in the receiver unit depending on the status of the transmitters, wherein in particular the optical sensor is transferred to a safe state.

In the normal state, operating information and diagnostic information is advantageously transmitted in the form of operating transmission protocols. In the error and diagnostic state, diagnostic information is transmitted in the form of diagnostic protocols, wherein the operating transmission protocols and diagnostic protocols differ from one another.

The diagnostic protocols are also advantageously different from the diagnostic protocols of other optical sensors.

This avoids mutual interference between a plurality of optical sensors where one optical sensor erroneously receives and evaluates diagnostic information from another optical sensor. It is of course also possible to differentiate between the operating information from a plurality of optical sensors.

The operational information to be transmitted represents considerable amounts of data which must be transmitted in short time intervals, resulting in high restrictions for the operating transmission protocols. In contrast, there are considerably fewer restrictions for the diagnostic logs, in particular because the data volumes of the diagnostic information are considerably smaller than the data volumes of the operating information.

Advantageously, the optical sensor works in such a way that the light beams are imprinted with identifiers in the form of beam codings, by means of which the light beams are identifiable and distinguishable.

With an optical sensor in the form of a light barrier, which has only one beam axis, the light beams can be distinguished from interfering radiation by means of the beam codings, which interfering radiation is transmitted in particular by other optical sensors.

This is also the case with an optical sensor in the form of a light curtain. In addition, the individual beam axes can be distinguished from each other on the receiving side using the identifiers of the light beams. This also enables optical synchronization of the light curtain using at least one of the beam axes.

Advantageously, the transmitters emit light beams in the form of light pulses. The beam codings can then be defined in the form of the number of light pulses in pulse sequences of the transmitters, by the pulse pauses between individual light pulses or also by pulse widths, i.e. pulse durations of the individual light pulses.

An essential aspect consists in the fact that the operating information and diagnostic information is formed by beam codings provided in addition to the identifiers.

According to an advantageous embodiment, in the case of an optical sensor formed as a light curtain, the operating information and/or the diagnostic information is only transmitted via individual, selected beam axes.

In the normal state of the optical sensor, diagnostic information and operating information can be transmitted alternately, i.e. the transmission of diagnostic information is followed by the transmission of operating information. Alternatively, in the normal state of the optical sensor, diagnostic information and operating information can be transmitted cyclically. Finally, in the error and diagnostic state, diagnostic information alone is transmitted cyclically.

In such cyclic transmission, it is possible in particular that only part of a diagnostic information or operating information is transmitted within a cycle, and that the diagnostic information or operating information is composed on the receiving side from a plurality of partial information which is transmitted in individual cycles.

This type of transmission is suitable in particular for diagnostic information where only small amounts of data are generated and there are no strict restrictions on the transmitting sides.

According to a particularly advantageous embodiment, the operating information and diagnostic information contain test information, wherein this test information is checked on the receiving side to determine the validity of the operating information and diagnostic information.

The test information can be parity bits, CRC checksums and the like.

Using the test information, the validity of the operating information and diagnostic information is advantageously checked in the evaluation unit of the receiver unit, wherein expediently only validated operating information and diagnostic information is evaluated in the evaluation unit.

The test information ensures fail-safe transmission of operating information and diagnostic information, which is essential for optical sensors formed as safety sensors in particular.

BRIEF DESCRIPTION OF THE DRAWINGS

The invention is explained below on the basis of the drawings. The Figures show:

FIG. 5: Example of a cyclical transmission of operating information and diagnostic information.

FIG. 6: Example of an alternating transmission of operating information and diagnostic information.

FIG. 8A: First example of transmission of diagnostic information.

FIG. 8B: Second example of transmission of diagnostic information.

FIG. 8C: Third example of transmission of diagnostic information.

DETAILED DESCRIPTION OF THE PREFERRED EMBODIMENTS

Figure 1:
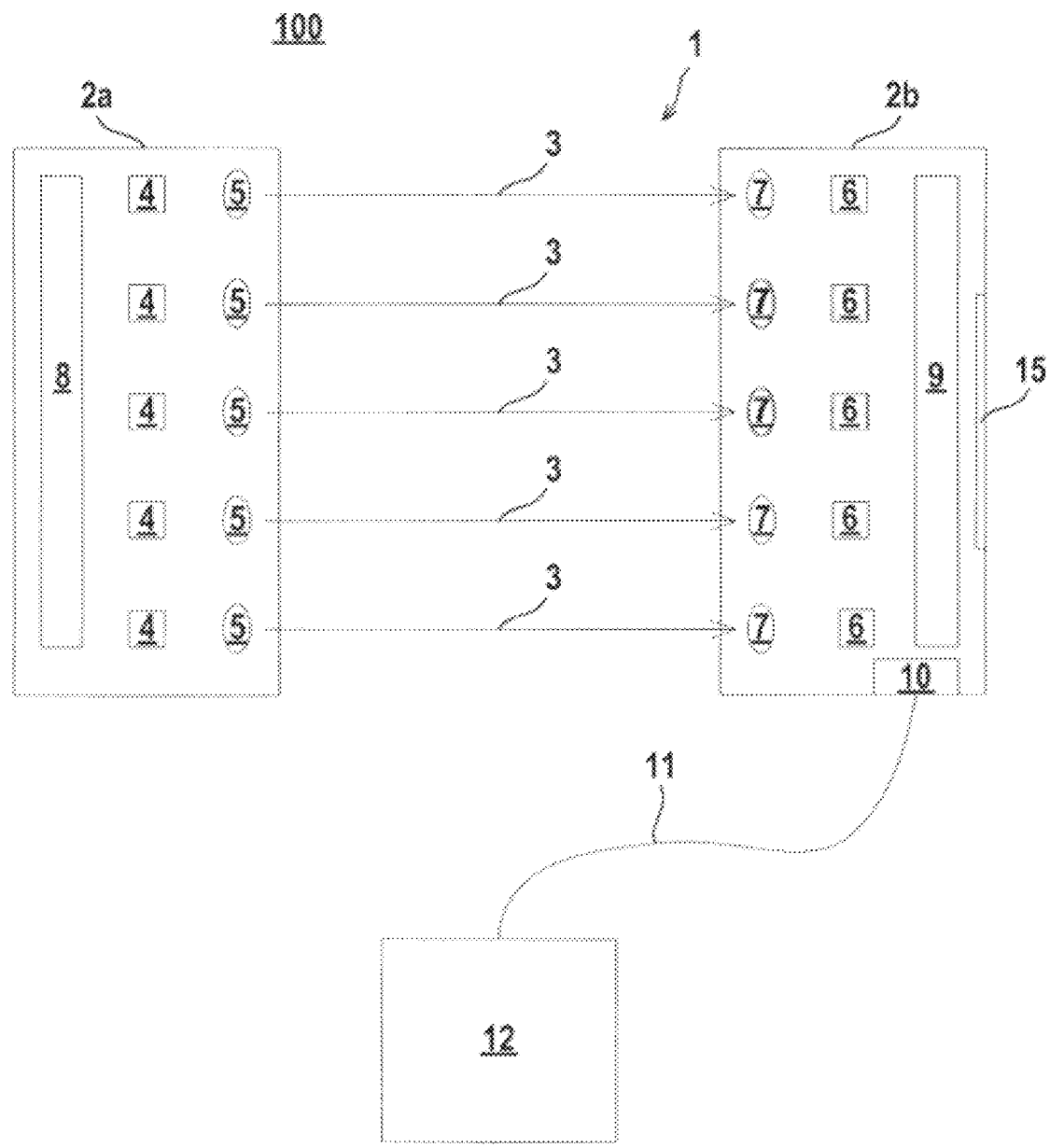
FIG. 1: Embodiment example of the sensor arrangement with a light curtain according to the invention.

FIG. 1 shows an embodiment example of the sensor arrangement 100 according to the invention.

The sensor arrangement 100 comprises an optical sensor in the form of a light curtain 1, which is used for capturing objects within a monitoring area.

The light curtain 1 has a transmitter unit with a housing 2a with a line arrangement of transmitters 4 emitting light beams 3, and transmitting optical systems 5 assigned to these transmitters 4. Furthermore, the light curtain 1 has a receiver unit with a second housing 2b with a line arrangement of receivers 6 receiving light beams 3, respectively upstream of which receivers 6 a receiving optical system 7 is arranged.

The housings 2a, 2b are arranged at opposite edges of the monitoring area such that in each case a receiver 6 is arranged opposite a transmitter 4 and forms a transmitter-receiver pair therewith, wherein the light beams 3 of the transmitter 4 form a beam axis. In the present case, five beam axes are provided. Of course, the light curtain 1 can also have a different number of beam axes. In general, the optical sensor can also be formed as a light barrier with only one beam axis.

The transmitters 4 are controlled by a transmitter control 8. An evaluation unit 9 is assigned to the receivers 6. The beam axes are activated cyclically one after the other. The evaluation unit 9 controls the receivers 6 and evaluates their received signals to generate an object detection signal in the form of a binary switching signal, the switching states of which indicate whether an object is located in the monitoring area or not. When the monitoring area is clear, the light beams 3 of the beam axes reach the receiver 6 of the respective beam axis in unhindered manner. At least one beam axis is interrupted in the event of object interference. The evaluation unit 9 can have a multi-channel design if the light curtain 1 forms a safety sensor.

The capturing of objects takes place in a working operation of the light curtain 1. In that mode, the transmitters 4 emit light beams 3 in the form of light pulses.

The transmitters 4 are activated cyclically one after the other by means of a sliding chain in the transmitter control 8. Accordingly, the receivers 6 are activated cyclically one after the other by means of a sliding chain. The light curtain 1 is optically synchronized so that its transmitter-receiver pairs are activated cyclically one after the other.

The light beams 3 of the light curtain 1 have different identifiers in the form of beam codings, wherein the beam codings are formed by different pulse sequences of light pulses. This allows a distinction to be made between normal beams, which are only used for object detection, and synchronization beams, which are also used for optical synchronization of the light curtain 1.

The light curtain 1 or the optical sensor in general can be formed as a safety sensor. A fail-safe design of the safety sensor is advantageously realized by a redundantly designed evaluation unit 9. For example, the evaluation unit 9 may consist of two computer units which monitor each other cyclically.

One example of a safety-related application of the safety sensor is hazard monitoring on a plant. The switching signals generated by the safety sensor are output to a control of the plant. Operation of the plant is only enabled if a clear monitoring area is detected with the safety sensor and the safety sensor is working without errors.

A display unit 15 is connected to the evaluation unit 9 and is visibly arranged on the outside of the housing 2b. In the present case, the display unit 15 is formed as a display. In the simplest case, the display unit 15 can be formed by an arrangement of light-emitting diodes or the like.

As an optional extension, the light curtain 1 comprises a digital or analog interface 10, to which a communication system 11 is connected as a further component of the sensor arrangement 100. The communication system 11 is used to produce a data connection to an external unit 12, which is also part of the sensor arrangement 100.

Advantageously, the communication system 11 is an IO-link connection, a field bus or a Bluetooth, WLAN or NFC data connection.

The external unit 12 can be a master of a bus system.

In particular, the external unit 12 has or is an operating or display device.

The display device can be used to display information of the light curtain 1 which is transmitted via the communication system 11.

According to the invention, transmitter information, namely operating information and/or diagnostic information, is sent to the assigned receivers 6 via light beams 3 of the transmitters 4 of the light curtain 1. The operating information and/or diagnostic information of the transmitters 4 and also of the receivers 6 is stored and also evaluated in the evaluation unit 9, in particular in order to generate information derived from the operating information and/or diagnostic information. The operating information and/or diagnostic information as well as the derived information is displayed in full or in part on the display unit 15. In addition, the operating information and/or diagnostic information and, if applicable, any information derived therefrom is sent to the external unit 12 via the communication systems 11 and displayed there if applicable. This also allows the light curtain 1 to be controlled by the external unit 12.

Advantageously, there is a non-volatile memory in the evaluation unit 9, in which operating information and/or diagnostic information and/or information derived therefrom is stored. Operating information and/or diagnostic information and/or information derived therefrom can be read from the non-volatile memory at predeterminable times and output via the interface 10.

The operating information can be device functions or configurations of the light curtain 1, in particular of the transmitter unit. The diagnostic information is status information or errors that may occur in the transmitter unit.

Advantageously, only diagnostic information is transmitted in an error or diagnostic state of the transmitter or transmitters.

In contrast, in a normal state of the transmitter or transmitters 4, operating information is transmitted alone or combined with diagnostic information.

In particular only diagnostic information is transmitted by the transmitter or transmitters 4 for a predetermined time period after the error or diagnostic state has ceased. After this time period has elapsed, operating information is transmitted.

Furthermore, advantageously, the transmission of operating information and/or diagnostic information is started upon switching on the transmitter or transmitters 4 and maintained for a predetermined time period.

In the normal state, operating information and, advantageously, also diagnostic information can be transmitted in the form of operating transmission protocols.

Figure 2:
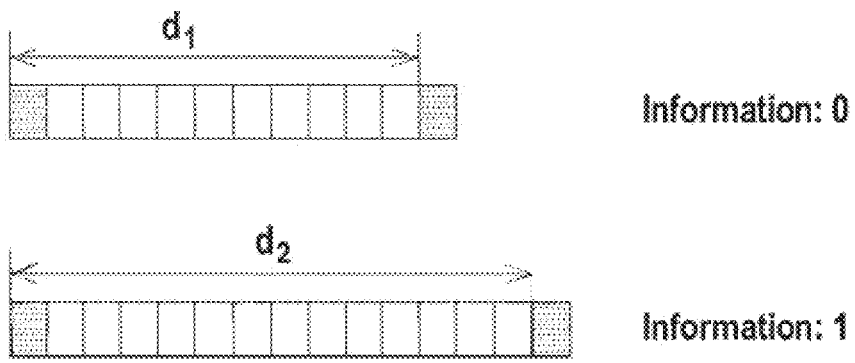
FIG. 2: Example of operating transmission protocols for the light curtain according to FIG. 1.

As shown in FIG. 2, different types of information can be transmitted using the operating transmission protocol. There, two pieces of information (bits) are coded by different sequences of pulse intervals of the light pulses, wherein the coding is given by different numbers of light pulses and pulse intervals of neighboring light pulses of the light beams 3 of a transmitter 4.

Figure 3A:
FIG. 3A: Example of an ident frame of an operating transmission protocol.
Figure 3B:
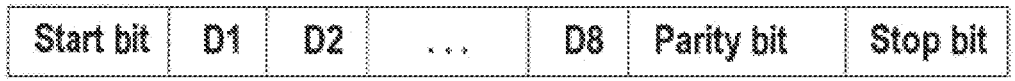
FIG. 3B Example of a data frame of an operating transmission protocol.

FIG. 3a shows an ident frame for the transmission of information within the operating transmission protocol. The ident frame defines the number and structure of the subsequent data frames (FIG. 3b) for data transmission in the operating transmission protocol. As FIG. 3a shows, the ident frame has a start bit, information bits 11 . . . . In, a parity bit and a stop bit.

Figure 4:
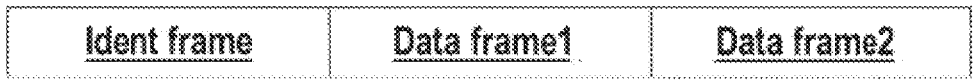
FIG. 4: Transmission example with an ident frame followed by two data frames.

For information transmission, one or more data frames (FIG. 4) are sent from a transmitter 4 to the assigned receiver 6 according to the structure of the ident frame. In the data frame, fields $D_1 \ldots D_n$ of the data frame are filled with data, wherein in the case of FIG. 4 there are two data frames with eight data bits $D_1 \ldots D_8$ each.

Using the parity bit or generally a test information, the transmitted information is checked and validated on the receiving side.

In the normal state, the operating transmission protocol is used to transmit operating information and if applicable also diagnostic information via all or only selected beam axes of the light curtain 1.

FIG. 5 shows a cyclical transmission of operating information and diagnostic information.

FIG. 6 shows of an alternating transmission of operating information and diagnostic information.

In the embodiment shown in FIGS. 5 and 6, the article number, the serial number, the year of manufacture, a firmware version, the type designation as device parameters of the light curtain 1 and also the current configuration of the light curtain 1 are provided as exemplary operating information.

In the error and diagnostic state, only diagnostic information is transmitted, namely as part of a diagnostic protocol. The diagnostic information is not transmitted via all beam axes, but only via a few selected beam axes. In the present case, diagnostic information is only transmitted via the first and last beam axis of the light curtain 1. Advantageously, the transmission of diagnostic information via these beam axes is temporally offset.

Advantageously, the diagnostic information is transmitted cyclically. Partial information can also be sent within a cycle, which information is then combined on the receiving side to form the mentioned diagnostic information.

FIGS. 7a to 7e show different beam codings, which consist of individual bits formed by the number of pulses or pulse intervals of neighboring light pulses of pulse sequences via beam axes.

Figure 7A:
FIG. 7A: Identifier of a normal beam of the light curtain according to FIG. 1.
Figure 7B:
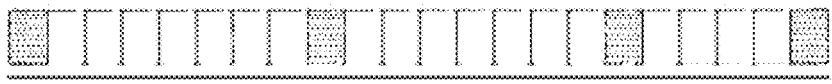
FIG. 7B Identifier of a synchronization beam of the light curtain according to FIG. 1.
Figure 7C:
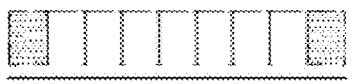
FIG. 7C First diagnostic protocol of a beam axis of the light curtain.
Figure 7D:
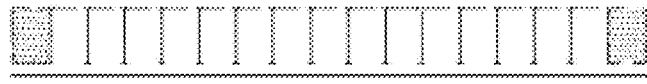
FIG. 7D Second diagnostic protocol of a beam axis of the light curtain.
Figure 7E:
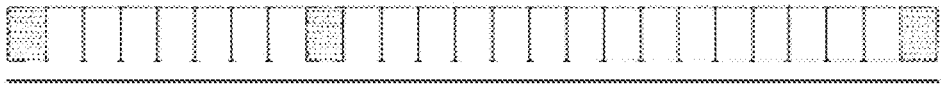
FIG. 7E Third diagnostic protocol of a beam axis of the light curtain.

FIG. 7a shows the beam coding of a normal beam. FIG. 7b shows the beam coding of a synchronization beam. FIG. 7c shows the beam coding of diagnostic information with a signal state 0, which information is transmitted via a beam axis. FIGS. 7d, 7e show two variants of diagnostic information with a signal state 1, which information is transmitted via a beam axis. In the case of FIGS. 7c to 7e, the diagnostic information is transmitted via a synchronization beam.

FIGS. 8a to 8c show different variants of the transmission of data information.

FIG. 8a shows a transmission of binary diagnostic information 0011, with four pieces of information I, II, III, IV, which are linked in series.

The partial information I, II contains the information values 0. The partial information III, IV contains the information values 1

FIG. 8b shows a transmission of binary diagnostic information 010 with three pulse groups I, II, III, which are separated by fixed time intervals $t_s$. The signal value "0" is respectively coded in the pulse groups I, III. The signal value "1" is coded in pulse group II.

FIG. 8c shows a transmission of binary data information 0101 with four pulse groups I to IV. The signal value "0" is respectively coded in the pulse groups I, III. The signal value "1" is respectively coded in the pulse groups II, IV. A parity bit is available in pulse group IV for error protection.

Figure 9:
FIG. 9: Example of a transmission of diagnostic information via two beam axes of the light curtain.

FIG. 9 shows an example of a transmission of diagnostic information by means of two beam axes, wherein in the present case the first and last beam axis of the light curtain 1 is used.

The transmission of diagnostic information on the beam axes temporally offset. The start of a transfer on one beam axis is recognized by a long pause which occurs from the other beam axis due to this transfer.

In this case, the diagnostic information is transmitted redundantly via both beam axes.

Figure 10:
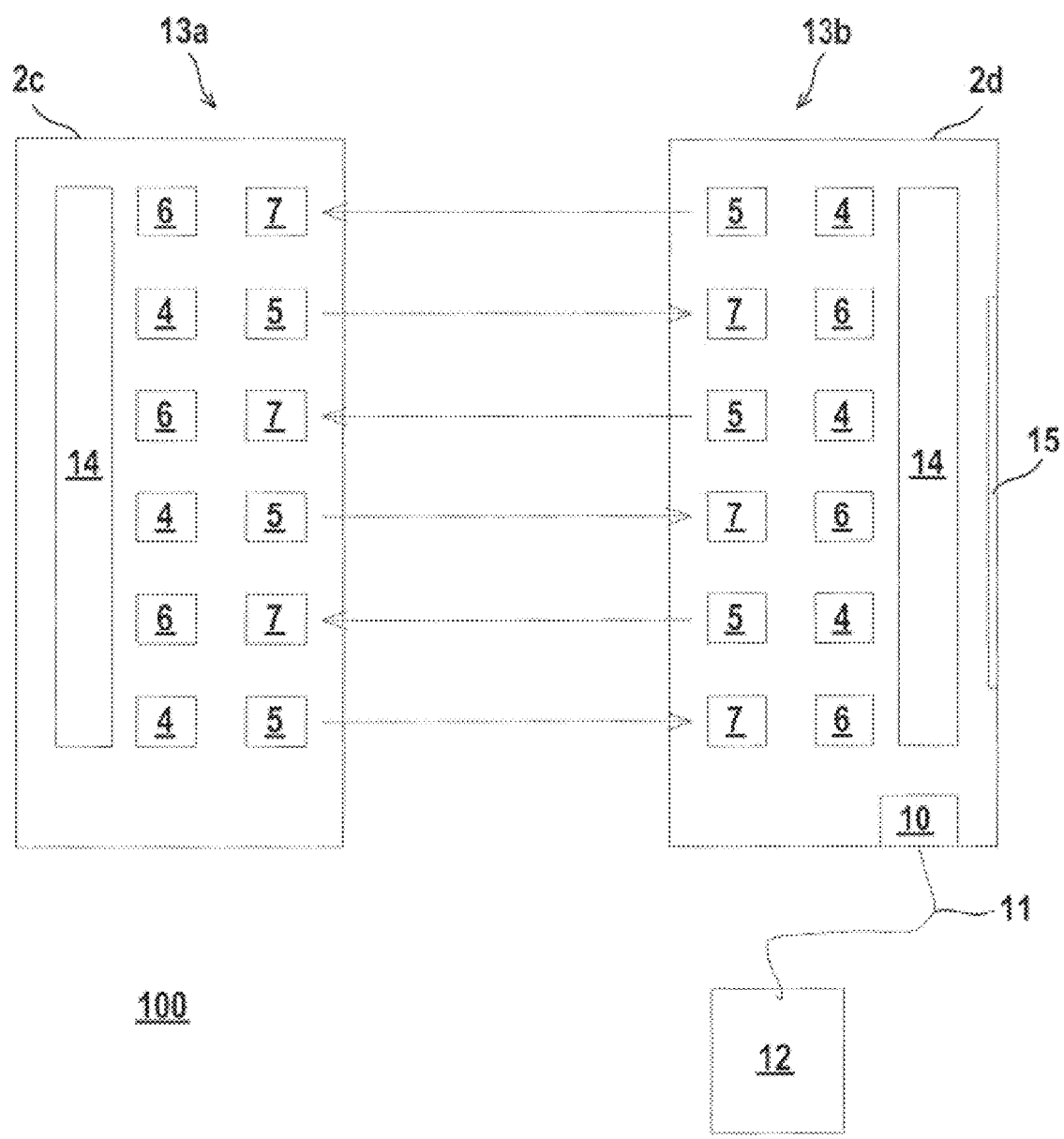
FIG. 10: Embodiment example of the sensor arrangement with two transceivers according to the invention.

FIG. 10 shows a further embodiment example of the sensor arrangement 100 according to the invention. This sensor arrangement 100 has two transceivers 13a, 13b arranged at opposite edges of the monitoring area. The components of each transceiver 13a, 13b are each integrated in a housing 2c, 2d.

Each transceiver 13a, 13b has a line arrangement of transmitters 4 and receivers 6, which are arranged alternately in such a way that light beams 3 from a transmitter 4 of a transceiver 13a, 13b hit an associated receiver 6 of the other transceiver 13b, 13a when the monitoring area is clear. In each transceiver 13a, 13b a control and evaluation unit 14 is provided, which is used to control the transmitters 4 and to evaluate the received signals of the receivers 6 of the respective transceiver 13a, 13b.

In the present case, a display unit 15 is only provided on the housing 2d of one of the transceivers 13b. Analogous to the embodiment according to FIG. 1, the display unit 15 is connected to the control and evaluation unit 14, so that operating information stored and evaluated in the control and evaluation unit 14 and/or diagnostic information and/or information derived therefrom can be visualized on the display unit 15.

Only the transceiver 13b has an interface 10 for connecting the communication system 11 and the external unit 12.

LIST OF REFERENCE NUMERALS (1) Light curtain
(2a) Housing
(2b) Housing
(2c) Housing
(2d) Housing
(3) Light beam
(4) Transmitter
(5) Transmission optical system
(6) Receiver
(7) Receiving optical system
(8) Transmitter control
(9) Evaluation unit
(10) Interface
(11) Communication system
(12) External unit
(13a) Transceiver
(13b) Transceiver
(14) Control and evaluation unit
(15) Display unit
(100) Sensor arrangement

The invention claimed is:

1. A sensor arrangement (100) with an optical sensor, wherein the optical sensor has at least one beam axis which is formed by a transmitter (4) emitting light beams (3) and a receiver (6) spatially separated from the transmitter (4), which receiver is formed to receive the light beams (3) of the transmitter (4), and with an evaluation unit (9) or a control and evaluation unit (14) in which an object detection signal is generated depending on the received signals of the receiver (6), wherein optical communication between transmitter (4) and receiver (6) is possible by means of the light beams (3), characterized in that the transmitter (4) electively transmits operating information or diagnostic information to the receiver (6) by means of the light beams (3), wherein the transmission is cyclical, in that the receiver (6) and the evaluation unit (9) or the control and evaluation unit (14) are integrated in a housing (2b) on which there is a display unit (15), in that the operating information and diagnostic information is stored and evaluated in the evaluation unit (9) or control and evaluation unit (14) and displayed on the display unit (15).

2. The sensor arrangement (100) according to claim 1, characterized in that, in the optical sensor, the or all transmitters (4) are integrated in a transmitter unit and the or all receivers (6) are integrated in a receiver unit, wherein the evaluation unit (9) is integrated in the housing (2b) of the receiver unit and the display unit (15) is arranged on this housing (2b).

3. The sensor arrangement (100) according to claim 1, characterized in that the optical sensor has two spatially separated transceivers (13a, 13b), each with an arrangement of transmitters (4) and receivers (6) and a control and evaluation unit (14), wherein there is a display unit (15) on at least one housing (2d) of the transceivers (13a, 13b).

4. The sensor arrangement (100) according to claim 1, characterized in that operating information and/or diagnostic information and/or information derived from operating information and/or diagnostic information is output to an external unit via a communication system (11).

5. The sensor arrangement (100) according to claim 4, characterized in that the communication system (11) is an IO-link connection, a field bus or a Bluetooth, WLAN or NFC data connection.

6. The sensor arrangement (100) according to claim 1, characterized in that in an error or diagnostic state of the transmitter or transmitters (4), only diagnostic information is transmitted, and/or in that in a normal state of the transmitter or transmitters (4), operating information is transmitted alone or combined with diagnostic information.

7. The sensor arrangement (100) according to claim 6, characterized in that only diagnostic information is transmitted by the transmitter or transmitters (4) for a predetermined time period after the error or diagnostic state has ceased, and in that operating information is transmitted after this time period has elapsed.

8. The sensor arrangement (100) according to claim 1, characterized in that the transmission of operating information and/or diagnostic information is started upon switching on the transmitter or transmitters (4) and maintained for a predetermined time period.

9. The sensor arrangement (100) according to claim 1, characterized in that, in the normal state, operating information and diagnostic information is transmitted in the form of operating transmission protocols, and in that, in the error and diagnostic state, diagnostic information is transmitted in the form of diagnostic protocols, wherein the operating transmission protocols and diagnostic protocols differ from one another.

10. The sensor arrangement (100) according to claim 1, characterized in that, in the case of an optical sensor formed as a light curtain (1), the operating information is transmitted optionally via all beam axes or only on selected beam axes and the diagnostic information is transmitted only via individual, selected beam axes, wherein the light beams (3) are imprinted with identifiers in the form of beam codings, by means of which the light beams (3) are identifiable and distinguishable.

11. The sensor arrangement (100) according to claim 10, characterized in that, in the case of an optical sensor formed as a light curtain (1), the light beams (3) of at least one transmitter (4) are used for optical synchronization of the light curtain (1), and/or in that the operating information and diagnostic information is formed by beam codings provided in addition to the identifiers.

12. The sensor arrangement (100) according to claim 1, characterized in that diagnostic information and operating information is transmitted alternately.

13. The sensor arrangement (100) according to claim 12, characterized in that only part of a diagnostic information or operating information is transmitted within a cycle, and in that the diagnostic information or operating information is composed on the receiving side from a plurality of partial information which is transmitted in individual cycles.

14. The sensor arrangement (100) according to claim 4, characterized in that the external unit (12) is or has an operating or display device, wherein operating information and/or diagnostic information is displayable by means of the display device.

15. The sensor arrangement (100) according to claim 1, characterized in that the optical sensor is a safety sensor, wherein the safety sensor is transferred to a safe state if an error state is detected based on the diagnostic information.

16. The sensor arrangement (100) according to claim 12, characterized in that the operating information and diagnostic information contain test information, wherein this test information is checked on the receiving side to determine the validity of the operating information and diagnostic information.

* * * * *